United States Patent [19]
Sprague

[11] Patent Number: 5,674,609
[45] Date of Patent: Oct. 7, 1997

[54] SEMI-ELASTOMERIC POLYTETRAFLUOROETHYLENE FILM

[76] Inventor: Walter John Sprague, R.D. 1 Box-7, Hoosick Falls, N.Y. 12090-9703

[21] Appl. No.: 468,169

[22] Filed: Jun. 6, 1995

Related U.S. Application Data

[63] Continuation-in-part of Ser. No. 364,574, Dec. 27, 1994, abandoned.

[51] Int. Cl.$^6$ .................................................. C09J 7/02
[52] U.S. Cl. ................................. 428/343; 428/422
[58] Field of Search ............................ 428/343, 421, 428/422

[56] References Cited

U.S. PATENT DOCUMENTS 4,555,543  11/1985  Effenberger et al. ............... 524/520
4,770,927  9/1988  Effenberger et al. ............... 428/245

Primary Examiner—Jenna Davis
Attorney, Agent, or Firm—Fay, Sharpe, Beall, Fagan, Minnich & McKee

[57] ABSTRACT

A semi-elastomeric film of substantially pure polytetrafluoroethylene, such film exhibiting an elastic stretch at loads increasing over the range of about 20 to about 30 pounds force with an elongation of about 50 to about 100%, and further exhibiting inelastic stretching above about 30 pounds force and about 100% elongation.

The film is particularly suitable for use in forming tapes used in cable splice-wrapping applications since the range of about 20 to about 30 pounds force is the load range characteristic of hand-wrapping. The resulting wrapping remains under tension, gripping the cable and conforming to the splice irregularities.

9 Claims, 1 Drawing Sheet

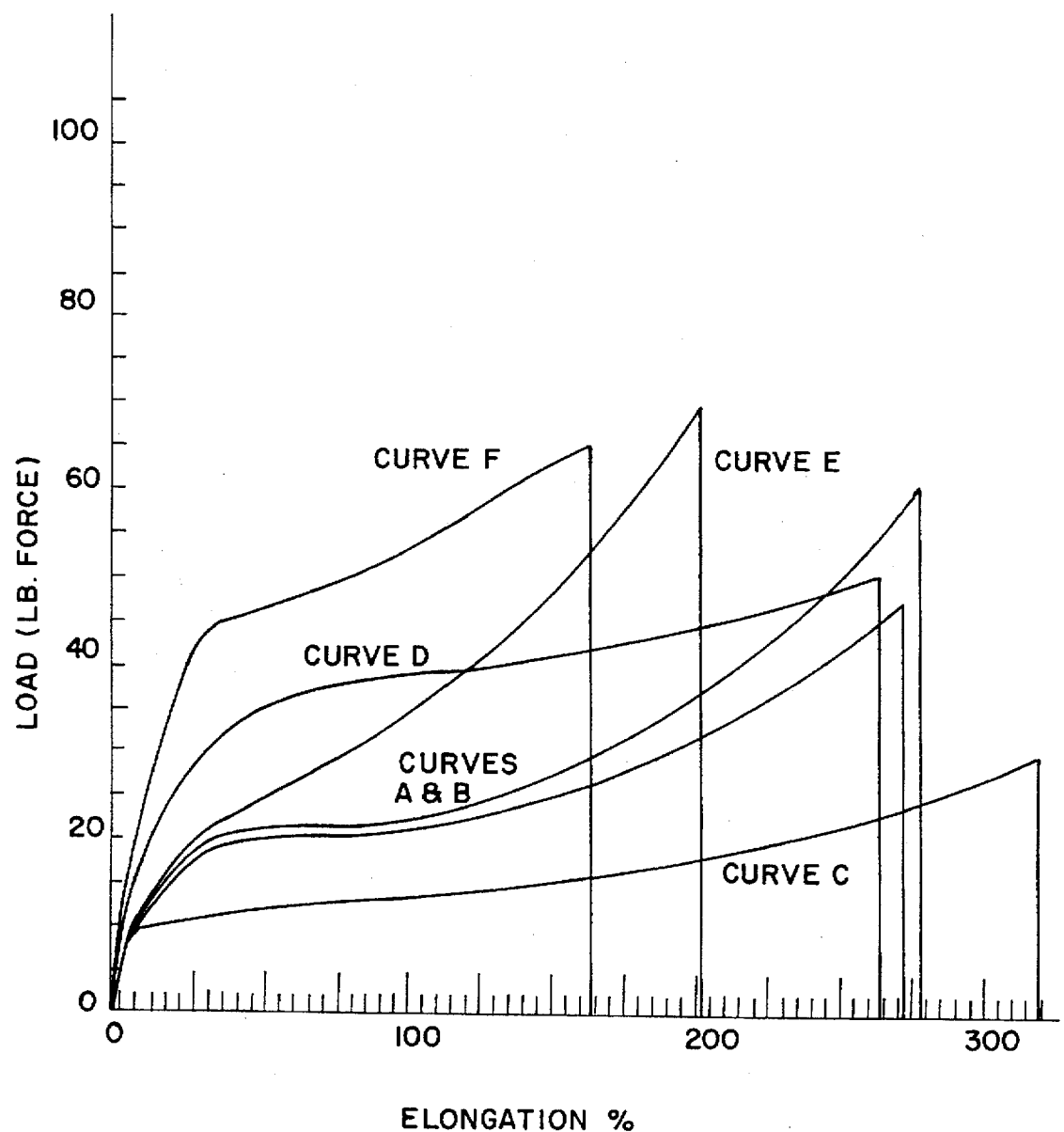

SEMI-ELASTOMERIC POLYTETRAFLUOROETHYLENE FILM

CROSS-REFERENCE TO RELATED APPLICATION

This application is a continuation-in-part of application Ser. No. 08/364,574, filed Dec. 27, 1994, now abandoned.

BACKGROUND OF THE INVENTION

1. Field of the Invention

This invention relates to films of polytetrafluoroethylene (PTFE) which exhibit semi-elastomeric properties.

2. Description of the Prior Art

Conventional films of PTFE do not exhibit elastomeric behavior over a useful load-elongation range. Previous attempts to obtain elastomeric qualities in perfluorinated (non-hydrogen containing) resins have found commercial solution only in the production of a copolymer of tetrafluoroethylene (TFE) and perfluoromethylvinyl ether (PMVE). Although this material is a perfluoroelastomer, it is very expensive and consequently finds use in only the most specialized applications.

More familiar elastomeric materials with some of the properties of perfluoropolymers are the fluoroelastomers, copolymers of hexafluoropropylene (HFP) and vinylidene fluoride ($VF_2$) and sometimes TFE. These are true elastomers, but they are not perfluorinated polymers, and suffer from the disadvantage of containing hydrogen. The hydrogen content causes their thermal and chemical properties to be inferior to those of PTFE and other perfluoropolymers.

Alloys or blends of PTFE and either TFE/PMVE or TFE/HFP/$VF_2$ exhibit semi-elastomeric properties, but the former suffers from the cost disadvantages associated with the perfluoroelastomer while the latter exhibits the inferior thermal and chemical stability associated with the hydrogen-containing fluoropolymers.

Conventional films of PTFE have been used in many applications. One such application is in splice-wrapping of cables in which a tape formed from a PTFE film typically 5 mil (0.005 inch) thick and 1 inch wide, and coated with a pressure sensitive adhesive, is wrapped by hand over splices in electrical cables. Such wrapping is used to provide electrical insulation and protection from environmental attack.

However, such tapes made from skived PTFE film result in wrappings which are not under tension and do not compress and grip the cable or conform to the irregularities of the splice. Tape incorporating conventional skived PTFE film stretches elastically 1 to 2% of its initial length at a load of about 10 pounds force (lbf), then yields abruptly and stretches inelastically 300% or more, undergoing continuous permanent deformation at more or less constant load, until it fails at 20 to 30 lbf.

On the other hand, tapes made from conventionally oriented PTFE film, for example, calendered skived or sintered extruded PTFE film, are difficult to stretch by hand to a point where they become elastic. Consequently, they also do not compress and grip the cable and conform to irregularities. These tapes do not begin to exhibit elastic elongation until they are loaded to 30 to 40 lbf. They then stretch more or less elastically, failing at 150 to 250 percent elongation and 50 to 70 lbf. load.

It would be desirable to provide a semi-elastomeric film of PTFE which stretches elastically in the load range characteristic of hand applications, which can be used in cable wrapping and other applications.

SUMMARY OF THE INVENTION

In accordance with this invention, there is provided a semi-elastomeric film of substantially pure polytetrafluoroethylene, such film exhibiting an elastic stretch at loads increasing over the range of from about 20 to about 30 pounds force producing an elongation of about 50 to about 100%, and further exhibiting inelastic stretching above about 30 pounds force and about 100% elongation.

The film of this invention is particularly suitable for use in forming tapes used in cable splice-wrapping applications since the range of from about 20 to about 30 pounds force is the load range characteristic of hand-wrapping. The resulting wrapping remains under tension, gripping the cable and conforming to the splice irregularities.

This invention also provides a tape formed from the polytetrafluoroethylene film which is coated with a pressure-sensitive adhesive.

BRIEF DESCRIPTION OF THE DRAWING

The sole Figure is a stress-strain curve of PTFE films of the present invention as well as prior art films.

DESCRIPTION OF THE PREFERRED EMBODIMENTS

The films of this invention are formed of substantially pure PTFE and exhibit elastomeric behavior over a useful load range. Such films are formed solely by mechanical and thermal means, and not through the use of chemically modified resins or the addition of plasticizers or alloying polymers. As used herein, the term "substantially pure PTFE" means a polymer formed substantially completely from repeating units of tetrafluoroethylene, with less than about 3%, preferably less than about 1% and most preferably less than about 0.5% by weight of other monomeric units. The most preferred material is formed of 100% TFE repeating units. Thus, the resin of which the present films are formed is most preferably pure polytetrafluoroethylene.

The film of this invention is treated by mechanical and thermal means to obtain its unique characteristics. The starting film is preferably a skived PTFE film. Such film is conventionally produced by molding a cylindrical billet of granular PTFE resin under high pressure, removing the billet from the mold, heating the billet in an oven above the sintering temperature of the PTFE resin to sinter the resin, and skiving the film from the billet using a skiving lathe. However, other types of sintered PTFE films, including cast films, may also be used as the starting film.

The thickness of the starting film is chosen to be greater than the desired thickness of the finished product, by a ratio that is varied as required to obtain the desired physical properties and thickness in the finished film. For example, reduction ratios of about 50% may be employed. As examples, to obtain a film having a final thickness of 5 mils, the starting film may be about 7 mils thick, and to obtain a film having a final thickness of 3 mils, the starting film may be about 5 mils thick. The films of this invention may be of typical thicknesses, such as from about 1 to about 10 mils. Preferred film thicknesses are from about 2 to about 6 mils.

In the first step of a process to manufacture the film of this invention, the starting film is re-melted by heating it to a temperature above the PTFE melting point, about 620° F. (327° C.). This step is preferably accomplished using a drum-type sintering device, with the drum temperature of, for example, from about 640° to about 740° F., more preferably about 710° F. The film may be fed at any desired speed, such as about 3–5 feet per minute, preferably about 4 feet per minute. An aluminum foil may be employed to support the film through the re-sintering step. The remelting step may be performed using other equipment.

In the second step of the process, the film is simultaneously compressed and heated, preferably using a calendar machine. For example, a pair of steel calendar rolls heated to about 400° F. may be employed, with the gap between the rolls set to yield the desired finished thickness, such as 5 mils. Other temperatures typically used in calendering PTFE film may be employed in the calendering step. The speed of the film through the calendar machine may be set as desired, such as about 4–6 feet per minute, preferably about 5 feet per minute. The resulting film may be cooled to room temperature in a conventional manner, such as by air cooling or passing the film around a water cooled roll.

As mentioned above, the films of this invention are considered semi-elastomeric. The term "elastic" as used herein describes a material which under increasing tensile load elongates in direct proportion to the load. In engineering terms, the stress-strain plot of such material is linear. The term "semi-elastomeric" is used to describe a material which has a stress-strain plot with both linear and non-linear segments.

The films of this invention are substantially pure PTFE films which exhibit an elastic stretch at loads increasing over the range of from about 20 to about 30 pounds force with an elongation of about 50 to about 100%, and further exhibit inelastic stretching above about 30 pounds force and about 100% elongation The film of this invention exhibits partially elastomeric behavior at elongations up to about 100% strain, whereas comparable films which are untreated exhibit partially elastomeric behavior at elongations up to only a few percent.

The film of this invention may be employed in many applications typical for PTFE films. For the cable splice-wrapping application mentioned above, the film may be coated with a conventional pressure-sensitive adhesive, such as a silicone-based adhesive. In such wrapping application, the spiral-wrapped film remains under tension, gripping the cable and conforming to the splice irregularities. The film is useful in other end uses requiring a partially elastomeric material with the unique chemical, electrical and mechanical properties of PTFE. Applications where conformation to irregular surfaces confers advantage would include other wrapping applications such as roller and hose wrapping, gasketing, sealing, and masking applications. Uses which would benefit from the flexibility of the film of this invention include application in machine components such as diaphragms and flap valves, and in safety and environmental chemical protective products such as protective clothing, tank linings, secondary containment films, and flue duct expansion joints.

As mentioned above, tape incorporating conventional PTFE film stretches elastically 1 to 2% of its initial length at a load of about 10 lbf, then yields abruptly and stretches inelastically 300% or more, undergoing continuous permanent deformation at more or less constant load, until it fails at 20 to 30 lbf. In contrast, tape based on film of the present invention behaves similarly at loads of 10 to 20 lbf, but stretches elastically at loads increasing from about 20 to about 30 lbf, elongating about 50 to 100%. As mentioned earlier, the range of about 20 to 30 lbf is typical of the hand-wrapping load range. After about 30 lbf load and 100% elongation, the film of this invention gradually yields and begins to strain-harden, continuing to elongate to failure typically above about 40 lbf load and about 200 percent elongation, typically to at about 50 to 60 lbf load and 200 to 300% elongation.

Typical physical properties of the films of this invention include breaking strength (ASTM D 1000) of 50 lbf/in. width minimum, an elongation (ASTM D 1000) of 225% minimum, a secant modulus at 95% strain (ASTM D 882) of between a minimum of 3300 psi and a maximum of 4700 psi, and a stress differential (stress at 95% strain minus stress at 45% strain per ASTM D 882) of a minimum of 50 psi and a maximum of 500 psi.

The films of this invention also exhibit improved wear properties and lower crystallinity (as measured by both X-ray diffraction and infrared spectroscopy) compared with films which are merely skived, skived and calendered, or sintered extruded and calendered.

The films of this invention, while not truly elastomeric, have distinctly elastomeric characteristics in a useful stress-strain range and are comprised preferably of pure PTFE. These desirable properties are obtained without the need for chemical modification, copolymerization, the addition of plasticizers or alloying polymers. As mentioned above, the prior art materials are either more expensive or exhibit inferior thermal and chemical stability. Other methods of modifying the characteristics of pure PTFE film by mechanical and thermal means, for example by hot-calendaring, are known. While such methods are effective in significantly increasing the load-elongation levels at which the film fails, such film does not exhibit elasticity in any portion of its stress-strain curve.

With reference to the Figure, stress-strain curves of several pure PTFE films are shown. Curves A and B represent films of this invention which are skived, then resintered and hot calendered (simultaneously compressed and heated). Curve C represents a conventional skived PTFE film. Curve D represents a conventional sintered extruded PTFE film. Curve E represents a conventional calendered skived PTFE film. Curve F represents a conventional calendered sintered extruded PTFE film.

It can be seen that the present invention provides a PTFE film which exhibits desirable physical properties without chemically modifying or alloying the PTFE.

What is claimed is:

1. A semi-elastomeric film of substantially pure polytetrafluoroethylene, said film exhibiting an elastic stretch at loads increasing over the range of about 20 to about 30 pounds force producing an elongation of about 50 to about 100%, and further exhibiting inelastic stretching above about 30 pounds force and about 100% elongation.

2. The film of claim 1 produced by a process of forming a skived film of polytetrafluoroethylene, heating said film above the sintering temperature to resinter the polytetrafluoroethylene and subjecting said resintered film to simultaneous pressure and heat.

3. The film of claim 2 wherein said step of subjecting said resintered film to simultaneous pressure and heat comprises a calendering step.

4. The film of claim 3, said film being formed of 100 percent polytetrafluoroethylene.

5. The film of claim 4, wherein said film exhibits an elastic stretch at loads increasing over the range of from about 10 to about 40 pounds force with an elongation of about 50 to about 100%, and inelastic stretching above about 40 pounds force and about 100% elongation.

6. The film of claim 4, wherein said film exhibits inelastic stretching above about 30 pounds force and about 100% elongation, and elongates to failure above about 40 pounds force and about 200% elongation.

7. The film of claim 1, said film having a breaking strength (ASTM D 1000) of 50 lbf/in. width minimum, an elongation (ASTM D 1000) of 225% minimum, a secant modulus at 95% strain (ASTM D 882) of between a minimum of 3300 psi and a maximum of 4700 psi, and a stress differential (stress at 95% strain minus stress at 45% strain per ASTM D 882) of a minimum of 50 psi and a maximum of 500 psi.

8. The film of claim 1 film being formed of 100 percent polytetrafluoroethylene.

9. A tape formed from the film of claim 1 coated with a pressure-sensitive adhesive.

* * * * *